United States Patent [19]

Murakami et al.

[11] Patent Number: 5,122,417
[45] Date of Patent: Jun. 16, 1992

[54] FIBER-REINFORCED COMPOSITE RESIN PULTRUSION PRODUCTS AND METHOD OF MANUFACTURING THE SAME

[75] Inventors: Shinkichi Murakami; Keijiro Manabe; Makiji Miyao; Mamoru Enomoto; Yuji Ishida; Hiroshi Inoue, all of Saitama, Japan

[73] Assignee: Toa Nenryo Kogyo Kabushiki Kaisha, Tokyo, Japan

[21] Appl. No.: 246,127

[22] Filed: Sep. 16, 1988

[30] Foreign Application Priority Data

Sep. 17, 1987 [JP] Japan .................... 62-233334
Dec. 21, 1987 [JP] Japan .................... 62-323189

[51] Int. Cl.⁵ .................................... B32B 33/00
[52] U.S. Cl. ............................ 428/371; 428/293; 428/294; 428/371; 428/377; 428/408; 428/295; 428/902
[58] Field of Search .............. 264/23, 123, 257, 258; 156/180, 198, 172, 173, 171, 175; 425/112, 508; 428/293, 294, 371, 377, 408, 295, 902

[56] References Cited

U.S. PATENT DOCUMENTS

| | | | |
|---|---|---|---|
| 3,556,888 | 1/1971 | Goldsworthy | 156/180 |
| 3,769,127 | 10/1973 | Goldworthy | 156/173 |
| 4,023,801 | 5/1977 | VanAoken | 428/222 |
| 4,167,429 | 10/1979 | Ackley | 156/180 |
| 4,341,580 | 7/1982 | Ahmed et al. | 156/195 |
| 4,462,946 | 7/1984 | Goldworthy | 264/23 |
| 4,820,366 | 4/1989 | Beever et al. | 156/180 |
| 4,848,745 | 7/1989 | Bohannan et al. | 428/222 |
| 4,883,552 | 11/1989 | O'Connor et al. | 156/180 |

OTHER PUBLICATIONS

Clemans et al., Thermoplastic Hybrid Yarns for High Performance Composites, Mar. 1988.

*Primary Examiner*—George F. Lesmes
*Assistant Examiner*—R. Weisberger
*Attorney, Agent, or Firm*—Seidel, Gonda, Lavorgna & Monaco

[57] ABSTRACT

This invention relates to fiber-reinforced composite resin pultrusion products of circular and noncircular cross-sectional contours, manufactured by impregnating fiber tows or rovings with a resin, drawing them into a die, and forming them into an article of predetermined size and shape, and then curing it, and relates also to a method for manufacturing the same.

11 Claims, 4 Drawing Sheets

FIBER-REINFORCED COMPOSITE RESIN PULTRUSION PRODUCTS AND METHOD OF MANUFACTURING THE SAME

TECHNICAL FIELD

This invention relates to fiber-reinforced composite resin pultrusion products of circular and noncircular cross-sectional contours, manufactured by impregnating fiber tows or rovings with a resin, drawing them into a die, and forming them into an article of predetermined size and shape, and then curing it, and relates also to a method for manufacturing the same.

The fiber-reinforced composite resin pultrusion products according to the present invention are embodied in the form of slender pipes or profiles having various circular or noncircular cross-sectional contours. They are advantageously used as lightweight, high-strength, and corrosion-resistant materials capable of withstanding axial tensile and compressive forces and also exhibiting high lateral torsional strength. They have extensive applications, e.g., as pillars, columns, beams, and other frame structure members and fluid pipelines in civil engineering and construction works, and as frame and machinery parts for the aircraft, space, automotive, shipbuilding, railway, and many other industries.

BACKGROUND ART

Lightweight, high-strength pipes and profiles of circular or noncircular contours have hitherto been required in the diverse fields as mentioned above. For these applications fiber-reinforced composite resin pultrusion products in the form of pipes and profiles, especially of noncircular cross-sectional contours, are attracting increasing attention.

Conventionally, the fiber-reinforced composite resin pultrusion products are made by pulling axially arranged rovings of resin-impregnated reinforcing fibers through a die to a desired shape and then curing the shape. Such fiber-reinforced composite resin pultrusion products attain axial tensile and compressive strengths but are questionable in lateral strengths, e.g., in torsional and bending strengths. To clear up the question, the so-called overwinding method has been proposed which involves helically winding reinforcing fibers round a mandrel and subsequent forming of the fibers by a die into a desired shape and curing to a final pultrusion product. The products manufactured by overwinding exhibit increased lateral strengths but are yet to be improved in axial strengths.

Heretofore, when a fiber-reinforced composite resin pultrusion product of a noncircular cross-sectional contour, such as a hollow square article, is to be obtained, it has been necessary first to form an article of a circular cross section by pultrusion and then work it to change the contour from a circle to a rectangle. The fabrication involves extreme difficulties, and the fiber density is lessened at corners than in the rest, leading to ununiform fiber distribution in the matrix. These and other problems have rendered it difficult to obtain products of good qualities. Moreover, it has been impossible to manufacture fiber-reinforced composite resin pultrusion products of noncircular cross-sectional contours, e.g., of the letter L-, H-, and I-shape by the overwinding method as described above.

Japanese Patent Application Public Disclosure No. 62-90234 discloses fiber-reinforced composite resin products having circular and noncircular cross-sectional contours, each product comprising rovings arranged in a predetermined size and shape along the length of the product, normal cloths having warp and weft, bias cloths formed over the normal cloths at the portions on which shearing forces may be imposed, and a continuous strand mat covering the outer periphery of the product.

Such fiber-reinforced composite resin products exhibit increased axial strengths and shearing strengths to bending but are questionable in lateral strengths because the reinforcing fibers which are wound at 90° and a certain angle with respect to the longitudinal axis of the product, each are discontinuous.

Further, the fiber-reinforced composite resin products require to cut the normal cloths, bias cloths and continuous strand mats in predetermined sizes and shapes prior to pultrusion. Furthermore, it is extremely difficult to arrange the web members in a given positional relationship along the rovings positioned in a predetermined shape and size, and to continuously draw the web members into a die to give the web laminate desired size and shape.

The present inventors, with the view to overcoming these difficulties of the prior art, have made extensive studies and experiments. It has now been found, as a result, that the combination of an axially-oriented fiber layer, formed of reinforcing fibers arranged axially, with a helical fiber layer, formed of reinforcing fibers wound helically with respect to the axis, imparts greater axial and lateral strengths to the product than does either layer alone.

Further studies and experiments by the present inventors on the manufacture of such fiber-reinforced composite resin pultrusion products by the overwinding technique, using carbon fiber in particular as the reinforcing fiber, revealed another problem. Especially in the process step of drawing an uncured carbon fiber-reinforced resin layer laminate consisting of axially-oriented and helical carbon fiber-reinforced resin layers into a die to give it desired size and shape, relative motion of the axially-oriented and helical carbon fiber-reinforced resin layers hampers the insertion of the helical carbon fibers at regular intervals. This was found to make it difficult to form a carbon fiber-reinforced resin layer laminate of a desired thickness and configuration.

In order to solve this problem, the present inventors have concentrated their efforts on the research and experiment on the structure and manufacture of carbon fiber-reinforced composite resin pultrusion products. It has now been found, as a result, that the above problem is solved by allowing either the axially-oriented carbon fiber-reinforced resin layer or the helical carbon fiber-reinforced resin layer or both to contain a given proportion of a fiber dissimilar to the carbon fiber, especially a dissimilar fiber in a fluffed state (in the form of woollike rovings of monofilaments in random orientation). It has also been found that the axial and lateral strengths of the pultrusion products thus obtained remain practically unchanged. This is presumably attributable to the fact the inclusion of a dissimilar fiber into a carbon fiber layer increases the frictional resistance of the layer sufficiently to hinder the relative motion of the layer and the overlying or underlying layer, thus preventing any irregular motion of the uncured carbon fiber-reinforced resin layer laminate while being drawn into the die.

The present invention is predicated upon this new discovery.

It is an object of the invention to provide fiber-reinforced composite resin pultrusion products having circular and noncircular cross-sectional contours markedly improved in axial and lateral strengths over conventional products.

Another object of the invention is to provide a method of manufacturing fiber-reinforced composite resin pultrusion products of not merely circular cross-sectional contours but also noncircular cross-sectional contours in particular, in a most simplified way and continuously by taking advantage of the over-winding technique.

SUMMARY OF THE INVENTION

The above objects are realized by the fiber-reinforced composite resin pultrusion products and the method of manufacturing the same in conformity with the invention. Briefly, the invention resides in a fiber-reinforced composite resin pultrusion product characterized by comprising an axially-oriented fiber layer composed of reinforcing fibers arranged axially and a helical fiber layer composed of reinforcing fibers helically wound round the axis. The axially-oriented and helical fiber layers, in a plurality of layers each, are alternately formed one over another. Desirably, the innermost layer of the product is an axially-oriented fiber layer.

The fiber-reinforced composite resin pultrusion product of the invention having a circular cross-sectional contour is manufactured by a method characterized by the steps of: (a) providing a slender mandrel of a circular cross-sectional contour; (b) forming a first fiber layer of a predetermined thickness by either arranging resin-impregnated fibers axially on or helically winding the fibers round the mandrel; (c) forming a second fiber layer by arranging resin-impregnated fibers over the first fiber layer in a direction different from that of the first layer; (d) when necessary, repeating the steps (b) and (c) the number of times desired to form an uncured fiber-layer laminate consisting of axially-oriented and helical fiber layers, and drawing the laminate into a die to give it desired size and shape; and (e) thereafter curing the fiber-layer laminate. The fiber-reinforced composite resin pultrusion product of the invention having a noncircular cross-sectional contour is suitably manufactured by a method which comprises the steps of: (a) providing a slender mandrel having a circular cross-sectional portion of a predetermined length and a noncircular cross-sectional portion adjoining the circular portion and gradually changed into a predetermined cross-sectional contour; (b) forming a first fiber layer of a predetermined thickness by either arranging resin-impregnated fibers axially on or helically winding the fibers round the circular cross-sectional portion of the mandrel; (c) forming a second fiber layer by arranging resin-impregnated fibers over the first fiber layer in a direction different from that of the first layer before curing the first layer; (d) when necessary, repeating the steps (b) and (c) the number of times desired to form an uncured fiber-layer laminate consisting of axially-oriented and helical fiber layers, conducting the laminate into the noncircular cross-sectional portion of the mandrel, and drawing the same into a die to give it desired size and shape; and (e) thereafter curing the fiber-layer laminate.

Further the reinforcing fiber constituting each fiber layer is carbon, glass, or aramid fiber and the matrix resin to be impregnated into the fiber is a thermosetting resin, such as an epoxy, unsaturated polyester, urethane acrylate, vinyl ester, phenol, or polyurethane, or a thermoplastic resin, such as nylon 6, nylon 66, nylon 12, PBT, PET, polycarbonate, polyacetal, polyphenylene sulfide, polyether ether ketone, polyether sulfide, polyphenylene oxide, modified polyphenylene oxide (e.g., NORYL) polypropylene, or polyvinyl chloride.

In particular, in the case where a carbon fiber is selected as the reinforcing fiber, either the axially-oriented fiber layer or the helical fiber layer or both desirably contain from 1 to 20% of a fiber dissimilar to the carbon fiber. Desirably, the dissimilar fiber is a fluffed one formed of glass fiber or aramid fiber in the form of rovings.

DETAILED DESCRIPTION OF THE PREFERRED EMBODIMENTS

Next, the fiber-reinforced composite resin pultrusion products according to the present invention will be described in more detail below.

Figure 1:
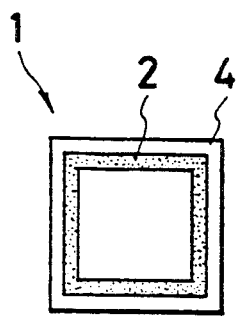
FIGS. 1 through 7 are cross-sectional views of embodiments of the fiber-reinforced composite resin pultrusion products of the present invention.
Figure 2:
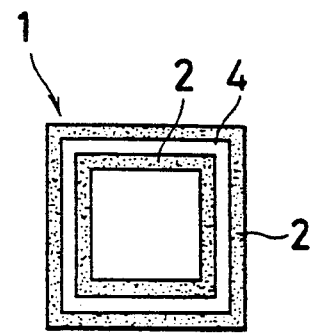
Figure 3:
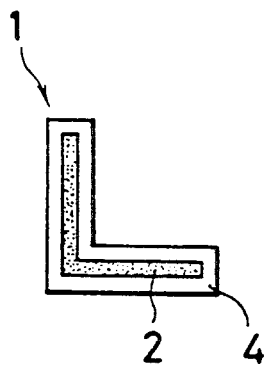
Figure 4:
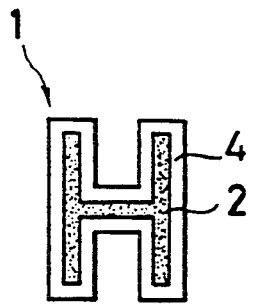
Figure 5:
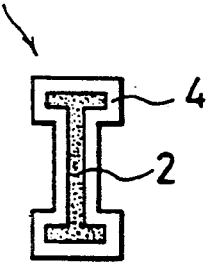
Figure 6:
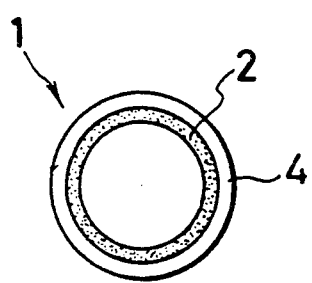
Figure 7:
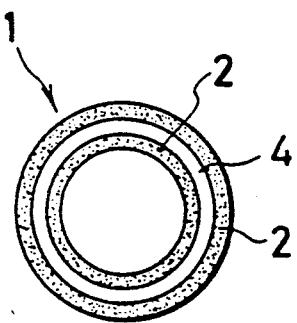

FIGS. 1 through 7 illustrate fiber-reinforced composite resin pultrusion products of noncircular and circular cross-sectional contours embodying the present invention. According to the invention, fiber-reinforced composite resin pultrusion products in the form of hollow tubes having rectangular cross-sectional contours such as shown in FIGS. 1 and 2 and other desired cross-sections are provided. Also, fiber-reinforced composite resin pultrusion products with desired cross-sectional contours, such as the letter L-, H-, and I-shaped profiles, as shown in FIGS. 3, 4, and 5, respectively, and, further, hollow tubular products with circular cross-sectional contours as indicated in FIGS. 6, and 7 are provided.

Referring now to FIG. 1, a fiber-reinforced composite resin pultrusion product of the present invention will be described. The pultrusion product 1 manufactured in accordance with the invention comprises an axially-oriented fiber layer 2 formed by axially arranging reinforcing fibers and a helical fiber layer 4 formed by helically winding reinforcing fibers at a predetermined angle to the axis. The inner layer of the product is desired to be the axially-oriented fiber layer 2, although the helical fiber layer 4 may be used instead. Alternatively, the axially-oriented fiber layer 2 and the helical fiber layer 4 may be provided in a plurality of layers each, superposed by turns as indicated in FIG. 2. In that case, the outermost layer may be either an axially-oriented fiber layer 2 as shown or a helical fiber layer 4, but the innermost layer is desirably another axially-oriented fiber layer 2. The use of an axially-oriented fiber layer 2 as the innermost layer permits smooth operation for the continuous manufacture of the product.

The winding angle of the fibers in the helical fiber layer 4 with respect to the axis, and the fiber density, layer thickness, and other factors of the fiber layers 2, 4 may be optionally chosen. For example, a winding angle in the range from 45° to 80° and fiber contents in the fiber layers 2, 4 from 50 to 60% by volume are appropriate.

For the individual layers 2, 4, reinforcing fiber and matrix resin of desired types may be used. Usually suitable as the reinforcing fiber is carbon, glass, or aramid fiber. The matrix resin to be impregnated into the fiber is desirably a thermosetting resin, such as an epoxy, unsaturated polyester, urethane acrylate, vinyl ester, phenol, or polyurethane, or a thermoplastic resins, such as nylon 6, nylon 66, nylon 12, PBT, PET, polycarbonate, polyacetal, polyphenylene sulfide, polyether ether ketone, polyether sulfide, polyphenylene oxide, modified polyphenylene oxide (e.g., NORYL) polypropylene, or polyvinyl chloride.

Although the present invention has been described as embodied in fiber-reinforced composite resin pultrusion products classified as hollow tubes of rectangular cross sections, the invention is not limited thereto. For example, as illustrated in FIGS. 3 to 5, profiles of the letter L-, H-, or I-shaped cross sections and other cross-sectional contours and, as in FIGS. 6 and 7, pipelike pultrusion products of circular cross-sectional contours can be manufactured as well.

Next, the method of the invention for the manufacture of fiber-reinforced composite resin pultrusion products will be explained.

Figure 10:
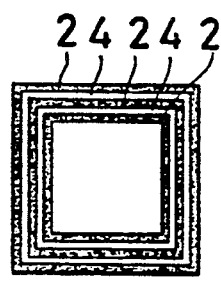
FIG. 10 is a cross-sectional view of a fiber-reinforced composite resin pultrusion product of the invention manufactured by the apparatus shown in FIG. 8.
Figure 8:
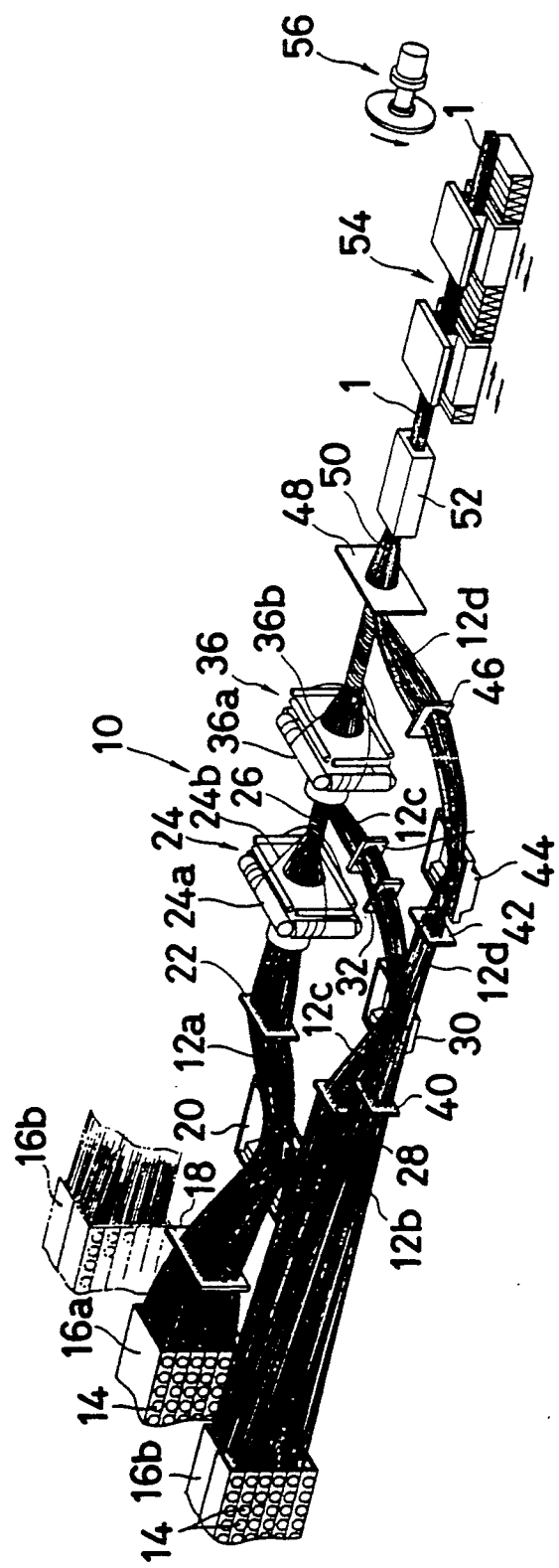
FIG. 8 is a schematic view illustrating an embodiment of the pultrusion apparatus for use in manufacturing a fiber-reinforced composite resin pultrusion product in accordance with the invention.

FIG. 8 illustrates a typical pultrusion apparatus 10 for manufacturing a fiber-reinforced composite resin pultrusion product 1 of a noncircular cross-sectional contour as referred to above. In this embodiment, as FIG. 10 specifically shows, a fiber-reinforced composite resin pultrusion product 1 of five-layer structure, consisting, from the innermost outward, of an axially-oriented fiber layer 2, a helical fiber layer 4, an axially-oriented fiber layer 2, a helical fiber layer 4, and an axially-oriented fiber layer 2 is manufactured.

In this pultrusion apparatus 10, there are a number of creels 14 on which the individual filaments or fibers of the reinforcing fiber 12 selected from among, e.g., carbon, glass, and aramid fibers, are wound. Groups of such creels are rotatably held in creel stands 16 (16a, 16b). Here are shown three creel stands 16, and a bundle of reinforcing fibers 12a from the first creel stand 16a is led through a guide plate 18 into a resin impregnation tray 20, where it is impregnated with a matrix resin. The bundle of resin-impregnated reinforcing fibers 12a from which excess resin has been wiped out is fed through a guide plate 22 to an overwinder 24. The fibers are axially arranged and longitudinally attached to a mandrel 26 (forming an axially-oriented fiber layer 2 to constitute the innermost layer). At the same time, reinforcing fibers 24b are paid out of a plurality of creels 24a mounted on the overwinder 24. They are wound on the longitudinally extended axially-oriented fiber layer 2 at a given angle, e.g., 70°, to the axis, thus forming a helical fiber layer 4. The reinforcing fibers from the creels 24a are not impregnated with the matrix resin. However, they are impregnated partly with excess matrix resin from the underlying axially-oriented fiber layer as they are wound on the mandrel and partly with the excess of resin from another axially-oriented fiber layer to overlie subsequently.

Second and third creel stands 16b are located symmetrically on both sides of the creel stand 16a to function likewise. In FIG. 8, therefore, only the creel stand 16b at the front, closer to the reader, is depicted in detail, the illustration of the stand on the far side being omitted. Part 12c of a bundle of reinforcing fibers 12b from the creel stand 16b is introduced through a guide plate 28 into a resin impregnation tray 30, where it is impregnated with the matrix. After the removal of excess resin, the bundle of resin-impregnated reinforcing fibers 12c is conducted through guide plates 32, 34 to an overwinder 36. The resin-impregnated reinforcing fibers 12c are axially fed to the mandrel 26 which extends through the centers of the overwinders 24, 36 and has already two reinforcing fiber layers, one axial and the other helical, formed thereon. They are longitudinally attached to the helical reinforcing fibers 24b (forming a second axially-oriented fiber layer 2). Simultaneously, reinforcing fibers 36b are paid out of a plurality of creels 36a mounted on the overwinder 36. They are wound on the longitudinally attached axially-oriented fiber layer 2 at a given angle, e.g., 70°, to the axis, thus forming a helical fiber layer 4. The overwinder 36 is rotated in the direction contrary to the overwinder 24, and hence the winding direction of the helical fiber layer 4 formed by the overwinder 36 is reverse to that of the helical fiber layer 4 formed by the overwinder 24. The reinforcing fibers from the creels 36a are not impregnated with the matrix resin. However, they are impregnated partly with excess matrix resin from the underlying axially-oriented fiber layer as they are wound on the mandrel and partly with the excessive matrix resin from another axially-oriented fiber layer to be longitudinally attached later.

Over the helically wound reinforcing fibers 36b, still another axially-oriented fiber layer to constitute the outermost layer is formed by the remainder 12d of the reinforcing fibers 12b from the second creel stand 16b. The bundle of remaining fibers 12d is led through guide plates 40, 42 into a resin impregnation tray 44, where it is impregnated with the matrix resin. The resin-impregnated reinforcing fibers 12d from which excess resin has been wiped out are guided through guide plates 46, 48 and arranged axially to form the outermost layer.

In the manner described a fiber-layer laminate 50, composed of a desired number each of axially-oriented fiber layers 2 and helical fiber layers 4, is formed on the mandrel 26.

For the reinforcing fibers 12a, 12b (12c, 12d) and 24b, 36b, carbon, glass, or aramid fiber is used as stated earlier. The resin impregnation trays 20, 30, 44 hold a resin solution which is prepared from a suitable matrix resin selected from among thermosetting resins, such as epoxy, unsaturated polyester, urethane acrylate, vinyl ester, phenol, and polyurethane, and thermoplastic resins, such as nylon 6, nylon 66, nylon 12, PBT, PET, polycarbonate, polyacetal, polyphenylene sulfide, polyether ether ketone, polyether sulfide, polyphenylene oxide, modified polyphenylene oxide (e.g., NORYL) polypropylene, and polyvinyl chloride. Where necessary, the solution is prepared by the addition of a filler, such as $CaCO_3$, mica, $Al(OH)_3$, or talc, an additive for improving the resistance to heat or weathering, colorant, etc.

Thus, a fiber-reinforced resin layer laminate 50 of five layers, i.e., from the innermost outward, an axially-oriented fiber layer 2, a helical fiber layer 4, an axial layer 2, a helical layer 4, and an axial layer 2, is formed on the mandrel 26.

Figure 9:
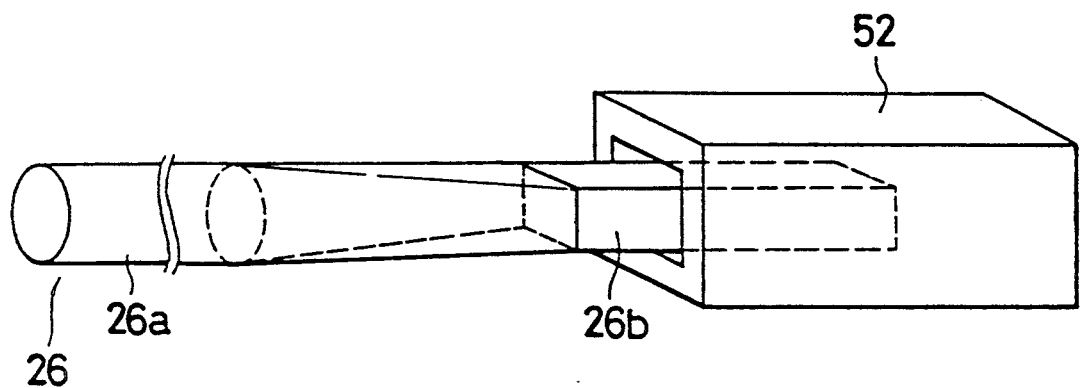
FIG. 9 is a diagrammatic perspective view of a mandrel and a die to be used in manufacturing the fiber-reinforced composite resin pultrusion products shown in FIGS. 1 and 2.

In the present invention, as embodied here, the mandrel 26 used in manufacturing a fiber-reinforced composite resin pultrusion product 1 in the form of a hollow tube of a rectangular cross-sectional contour comprises, as illustrated in FIG. 9, a portion 26a of a cross-sectional contour and a portion 26b of a noncircular cross-sectional contour, the circular sectional portion 26a being gradually deformed into the noncircular portion 26b. In this case, the circumference of the circular portion 26a and that of the noncircular portion 26b are made equal. The mandrel 26 is made circular in cross-sectional contour for the most part, from the circular end to the overwinders 24, 36 and farther to the point immediately before a die 52. The fiber-reinforced resin layer laminate 50 composed of axially-oriented fiber layers 2 and helical fiber layers 4 is formed on the circular portion 26a of the mandrel having the circular cross-sectional contour.

The fiber-reinforced resin layer 50 thus formed on the circular sectional mandrel portion 26a is then moved onto the noncircular portion, or the rectangular portion 26b here, of the mandrel and drawn into the die 52 having a rectangular cross-sectional contour. Shaped by the die 52 to a profile of predetermined dimensions, the fiber-reinforced resin layer 50 is hardened (cured) at room temperature or by heater means (not shown) to be a fiber-reinforced composite resin pultrusion product 1. A draw-off unit 54 and a cutter 56 are installed on the downstream side of the die 52 to draw off the fiber-reinforced composite resin pultrusion product 1 from the mandrel 26 and cut it into predetermined lengths. The structures and functions of the draw-off unit 54 and cutter 56 are well-known to those skilled in the art, and their detailed description is omitted.

Using the manufacturing method and the pultrusion apparatus of the construction described above, a rectangular, carbon-fiber-reinforced hollow resin tube, 20 by 20 mm in cross section and 3.5 mm in overall wall thickness, with the individual fiber layers having thicknesses, in the overlying order, of 0.5, 1.0, 0.5, 1.0, and 0.5 mm, could be manufactured at the rate of 1 m/min.

A carbon fiber 7 microns in filament diameter and having a strength of 340 kgf/mm$^2$ was employed as the reinforcing fiber. Each resin impregnation tray contained a resin solution prepared from 100 wt % of epoxy resin as the matrix resin and 10 wt % of calcium carbonate as a filler, and the solution was used for impregnating the carbon fiber.

The pultrusion product 1 manufactured in the foregoing way exhibited strengths as given in Table 1. Its superiority to conventional products will be understood.

TABLE 1

| | Torsional test results | |
| --- | --- | --- |
| | Breaking stress (kgf/mm$^2$) | Shear rigidity (kgf/mm$^2$) |
| Comparative Example 1 | 3.1 | 230 |
| Comparative Example 2 | 4.0 | 410 |
| This invention | 6.5 | 600 |

Comparative Example 1

Used a regular prismatic mandrel of the same size and shape as the mandrel employed in the present invention, without overwinding.

Comparative Example 2

Used a regular prismatic mandrel of the same size and shape as the mandrel employed in the present invention, with overwinding.

Figure 11:
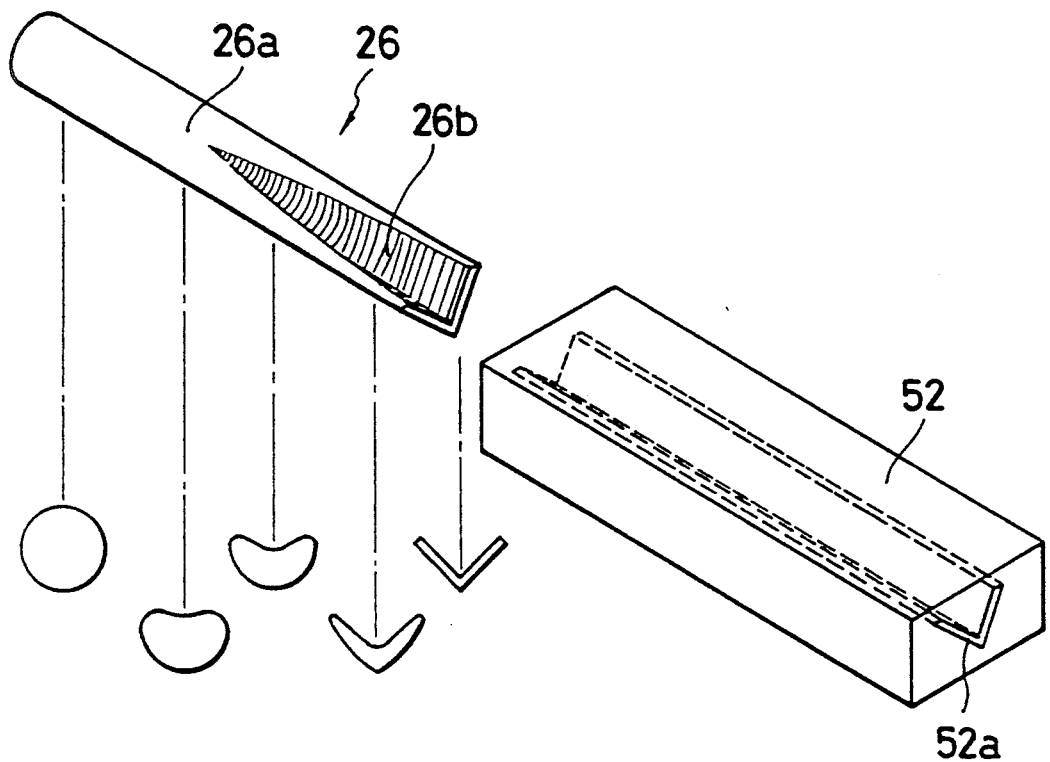
FIG. 11 is a perspective view of a mandrel and a die to be used in manufacturing the fiber-reinforced composite resin pultrusion product shown in FIG. 3.
Figure 12:
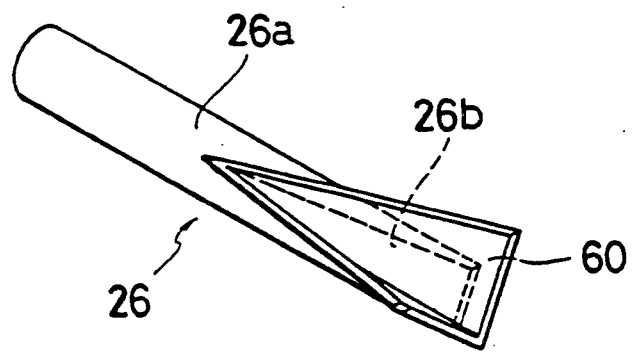
FIG. 12 is a perspective view of a guide member fitted in the mandrel used in manufacturing the fiber-reinforced composite resin pultrusion product of FIG. 3.

FIG. 11 illustrates an exemplary combination of a mandrel 26 and a die 52 to be used in manufacturing a fiber-reinforced composite resin pultrusion product 1 in accordance with the present invention, in the form of a letter L-shaped rod as, e.g., shown in FIG. 3. The mandrel 26 is so contoured that a circular portion 26a having a circular cross-sectional contour is gradually deformed into a noncircular portion 26b of a noncircular cross-sectional contour. In this case, the circumference of the circular portion 26a and that of the noncircular portion 26b are made equal. The mandrel 26 is made circular in cross-sectional contour for the most part, from the circular end to the overwinders 24, 36, and farther to the point immediately before the die 52. The fiber-reinforced resin layer 50 composed of axially-oriented fiber layers 2 and helical fiber layers 4 is formed on the circular portion 26a of the mandrel having the circular cross-sectional contour. The fiber-reinforced resin layer 50 thus formed on the circular sectional mandrel portion 26a is then fed onto the noncircular portion, or the letter L-shaped portion 26b here, of the mandrel and drawn into the die 52 having a rectangular cross-sectional contour. The fiber-reinforced resin layer 50, as shown in FIG. 12, is pressed against the recess of the mandrel 26b by the use of a properly shaped guide member 60. It is thereby deformed into a shape conforming to the outer configuration of the mandrel 26b. The die 52 is formed with a desired letter L-shaped guide groove 52a. It receives the resin layer 50 from the mandrel 26b and gives it a desired shape.

Thus, according to the present invention, the mandrel 26 and the die 52 are contoured beforehand as desired so that a noncircular fiber-reinforced composite resin pultrusion product 1 of a desired cross-sectional contour, e.g., of not only the letter L, but also the letter H or I, or a rectangle or other profile, can be continuously manufactured.

Heretofore, when a fiber-reinforced composite resin pultrusion product of a noncircular cross-sectional contour, such as a hollow square article, is to be obtained, it has been necessary first to form an article of a circular cross section by pultrusion and then work it to change the contour from a circle to a rectangle, as described above. The fabrication involves extreme difficulties, and the fiber density is lessened at corners than in the rest, leading to ununiform fiber distribution in the matrix. These and other problems have rendered it difficult to obtain products of good qualities. Moreover, it has been impossible to manufacture fiber-reinforced composite resin pultrusion products of noncircular cross-sectional contours, e.g., of the letter L-, H-, and I-shape by the overwinding method as described above. According to the present invention, the products of noncircular contours attain as high strengths as do circular products, with the individual fiber layers maintaining uniform thickness and even fiber distribution at the corners.

For the manufacture of products of circular cross-sectional contours in conformity with the invention, mandrels of desired diameters are employed in place of the mandrels used in the embodiments described above. Excepting this, the same apparatus and the same method can be used to manufacture the circular products.

In another embodiment of the present invention, when a carbon fiber is to be chosen as the reinforced fiber, in particular, either the axially-oriented fiber layer, i.e., axially-oriented carbon fiber-reinforced resin layer or the helical fiber layer, i.e., helical carbon fiber-reinforced resin or both desirably contain a fiber dissimilar to the carbon fiber, e.g., a glass fiber or aramid fiber in the form of rovings, in an amount of from 1 to 20%, preferably from 4 to 10%, on the basis of the total fiber content in the particular layer or layers. If the dissimilar fiber content is less than 1% the beneficial effect is not remarkable whereas a content in excess of 20% presents a strength problem.

Studies and experiments by the present inventors have revealed that the dissimilar fiber rovings are desired to be woollike ones of monofilaments in random orientation. For example, tests showed that the spun rovings of glass fiber manufactured by Pilkington Co. of England under the trade designation "2400TEX" and the like give good results.

The dissimilar fiber may be contained in either the axially-oriented carbon fiber-reinforced resin layer 2 or the helical carbon fiber-reinforced resin layer 4 or both. When a plurality of layers, such as the axially-oriented carbon fiber-resin layers 2 and a helical carbon fiber-resin layer 4 as in FIG. 2, are superposed by turns, at least one of the two axially-oriented carbon fiber-resin layers 2 sandwiching the helical resin layer 4 may contain the dissimilar fiber. In the case of a product of the structure illustrated in FIG. 10, both of the fiber-resin layers 2 constituting the innermost and the outermost layers may contain it.

In the present embodiment not only carbon fiber-reinforced composite resin pultrusion products classified as hollow tubes of rectangular cross sections, but also, as illustrated in FIGS. 3 to 5, profiles of the letter L-, H-, or I-shaped cross sections and other cross-sectional contours and, as in FIGS. 6 and 7, pipelike pultrusion products of circular cross-sectional contours can be manufactured.

The carbon fiber-reinforced composite resin pultrusion products of this embodiment can be manufactured as well by the pultrusion apparatus 10 for manufacturing the carbon fiber-reinforced composite resin pultrusion product 1 as described with reference to FIG. 8.

According to this embodiment all or a desired one of the bundles of carbon fibers 12a, 12b (12c, 12d) that constitute the axially-oriented carbon fiber-reinforced resin layers, preferably the bundles of carbon fibers 12c, 12d, contain a dissimilar fiber in the form already defined, preferably woollike spun rovings of glass fiber or aramid fiber rovings.

The resin impregnation trays 20, 30, 44 hold a resin solution which is prepared from a suitable matrix resin selected from among thermosetting resins, such as epoxy, unsaturated polyester, urethane acrylate, vinyl ester, phenol, and polyurethane, and thermoplastic resins, such as nylon 6, nylon 66, nylon 12, PBT, PET, polycarbonate, polyacetal, polyphenylene sulfide, polyether ether ketone, polyether sulfide, polyphenylene oxide, modified polyphenylene oxide (e.g., NORYL) polypropylene, and polyvinyl chloride. Where necessary, the solution is prepared by the addition of a filler, such as $CaCO_3$, mica, $Al(OH)_3$, or talc, an additive for improving the resistance to heat or weathering, colorant, etc.

In the same way as that described above a carbon fiber-reinforced resin layer laminate 50 of a five-layer structure consisting, from the innermost outward, of an axially-oriented carbon fiber-reinforced resin layer 2, a helical carbon fiber-reinforced resin layer 4, an axial layer 2, a helical layer 4, and an axial layer 2, is formed on the mandrel 26.

The carbon fiber-reinforced resin layer 50 thus formed on the circular sectional mandrel portion 26a is then moved onto the noncircular portion, or the rectangular portion 26b here, of the mandrel and drawn into the die 52 having a rectangular cross-sectional contour, as mentioned above.

In the embodiment being described, the filaments of the dissimilar fiber mixed in a given axially-oriented carbon fiber-reinforced resin layer 2 or layers 2 of the carbon fiber-reinforced resin layer laminate 50 procuce an increase in frictional resistance between the fibers and the helical carbon fiber-reinforced fiber layer 4, resulting in advantageously piercing the fiber into the helical carbon fiber-reinforced fiber layer 4. This brings about the increase of formability and property of the product. Namely, the mixing of the filaments of the dissimilar fiber in the laminate 50 precludes the possibility of the helical carbon fiber-reinforced resin layer being disturbed or deformed upon introduction into the die 52 of the carbon fiber-reinforced resin layer laminate 50 to render the fabrication to a desired shape difficult, as is the case with a conventional carbon fiber-reinforced resin layer laminate 50 without the filaments of the dissimilar fiber. There is no danger of the breaking of fiber or disturbance of orientation with consequent deterioration of the physical properties of the product. Understandably, it is alternatively possible that the dissimilar fiber be added to the helical carbon fiber-reinforced resin layer 4 instead of, or as well as, to the axially-oriented layer or layers 2.

The fiber-reinforced resin layer 50 thus most advantageously formed by the die 52 to a profile of predetermined dimensions is hardened (cured) by heater means (not shown) to be a carbon fiber-reinforced composite resin pultrusion product 1. The carbon fiber-reinforced composite resin pultrusion product 1 is drawn off from the mandrel 26 and cut it into predetermined lengths.

Using the manufacturing method and the pultrusion apparatus of the construction described above, a rectangular, carbon fiber-reinforced hollow resin tube, 20 by 20 mm in cross section and 2.5 mm in overall wall thickness, with the individual carbon fiber-reinforced resin layers having a thickness of 0.5 mm each, could be manufactured at the rate of 1 m/min.

As the carbon fiber, one having a filament diameter of 7 microns and a strength of 340 $kg/mm^2$ was employed. Each resin impregnation tray contained a resin solution prepared from 100 wt % of epoxy resin as the matrix resin and 10 wt % of calcium carbonate as a filler, and the solution was used for the impregnation of the carbon fiber. As for the dissimilar fiber, the above-mentioned spun rovings of glass fiber were mixed in all of the axially-oriented carbon fiber-reinforced layers 2 in an amount of 5% on the basis of the total weight of the layers 2.

The pultrusion product 1 manufactured in the foregoing way exhibited strengths as given in Table 2. It will be understood that the product 1 is superior to the conventional products and equal to the product of the aforementioned embodiment.

TABLE 2

| Torsional test results | |
|---|---|
| Breaking stress (kgf/mm$^2$) | Shear rigidity (kgf/mm$^2$) |
| This invention  6.5 | 600 |

For the manufacture of products of circular cross-sectional contours in conformity with this embodiment, mandrels of desired diameters may be employed in place of the mandrels used in the embodiments described above. Excepting this, the same apparatus and the same method can be used to manufacture the circular products.

In the foregoing embodiment of the invention the dissimilar fiber has been described as mixed in the axially-oriented carbon fiber-reinforced resin layers. Further experiments in accordance with the invention showed that the dissimilar fiber may be contained not only in the axially-oriented carbon fiber-reinforced resin layers but also in the helical carbon fiber-reinforced resin layers, or selectively in either of the layers, to achieve unchanged levels of breaking stress and shear rigidity.

Advantageous Effects of the Invention

As has been described hereinbefore, the fiber-reinforced composite resin pultrusion products according to the present invention are markedly improved in axial and lateral strengths over the conventional products. In addition, the method of the invention makes it possible advantageously to manufacture such fiber-reinforced composite resin pultrusion products in a most simplified way and continuously.

Further, it has been impossible, heretofore, to manufacture fiber-reinforced composite resin pultrusion products of noncircular cross-sectional contours, e.g., of the letter L-, H-, and I-shape by the overwinding method. According to the present invention, the products of noncircular contours attain as high strengths as do circular products, with the individual fiber layers maintaining uniform thickness and even fiber distribution at the corners.

Moreover, the manufacture of such fiber-reinforced composite resin pultrusion products by the overwinding technique, using carbon fiber in particular as the reinforcing fiber, presented another problem. Especially in the process step of drawing an uncured carbon fiber-reinforced resin layer laminate consisting of axially-oriented and helical carbon fiber-reinforced resin layers into a die to give it desired size and shape, relative motion of the axially-oriented and helical carbon fiber-reinforced resin layers hampered the insertion of the helical carbon fibers at regular intervals. This made it difficult to form a carbon fiber-reinforced resin layer laminate of a desired thickness and configuration.

The present invention has solved the above problem by allowing either the axially-oriented carbon fiber-reinforced resin layer or the helical carbon fiber-reinforced resin layer or both to contain a given proportion of a fiber dissimilar to the carbon fiber, especially a dissimilar fiber in a fluffed state. The present invention also provides the products having axial and lateral strengths.

We claim:

1. A fiber-reinforced composite resin pultrusion product characterized by comprising an axially-oriented fiber layer composed of reinforcing fibers arranged axially and a helical fiber layer composed of reinforcing fibers helically wound around the axis, wherein said reinforcing fiber constituting the fiber layer comprises carbon fibers and wherein either said axially-oriented fiber layer or said helical fiber layer or both comprise, in addition to said carbon fiber, from about 1 to about 20% of a fiber which is dissimilar to said carbon fiber.

2. A fiber-reinforced composite resin pultrusion product as defined in claim 1 wherein the axially-oriented and helical fiber layers, in a plurality of layers each, are alternately formed one over another.

3. A fiber-reinforced composite resin pultrusion product as defined in claim 1 wherein the innermost layer of the product is an axially-oriented fiber layer.

4. A fiber-reinforced composite resin pultrusion product as defined in claim 1 wherein the composite resin to be impregnated into said reinforcing fiber comprises a thermosetting resin or a thermoplastic resin.

5. A fiber-reinforced composite resin pultrusion product as defined in claim 4 wherein said thermosetting resin is selected from the group consisting essentially of an epoxy, unsaturated polyester, urethane acrylate, vinyl ester, phenol and polyurethane.

6. A fiber-reinforced composite resin pultrusion product as defined in claim 4 wherein said thermoplastic resin is selected from the group consisting of nylon 6, nylon 66, nylon 12, PBT, PET, polycarbonate, polyacetal, polyphenylene sulfide, polyether ether ketone, polyether sulfide, polyphenylene oxide, modified polyphenylene oxide, polypropylene, and polyvinyl chloride.

7. A fiber-reinforced composite resin pultrusion product as defined in claim 6 wherein said thermosetting resin is selected from the group consisting essentially of an epoxy, unsaturated polyester, urethane acrylate, vinyl ester, phenol and polyurethane.

8. A fiber-reinforced composite resin pultrusion product as defined by claim 1 wherein the cross-sectional contour of the product, as cut perpendicularly to the axis, is circular.

9. A fiber-reinforced composite resin pultrusion product as defined in claim 1 wherein the cross-sectional contour of the product, as cut perpendicularly to the axis, is noncircular.

10. A fiber-reinforced composite resin pultrusion product as defined in claim 1 wherein the dissimilar fiber is either glass fiber or aramid fiber in the form of rovings.

11. A fiber-reinforced composite resin pultrusion product as defined in claim 1 wherein the dissimilar fiber is in the form of woollike rovings of monofilaments in random orientation.

* * * * *